US010425169B2

(12) United States Patent
Partee

(10) Patent No.: US 10,425,169 B2
(45) Date of Patent: Sep. 24, 2019

(54) WIFI TEST CHAMBER

(71) Applicant: ATC Logistics & Electronics, Inc., Fort Worth, TX (US)

(72) Inventor: Jimmie Paul Partee, Double Oak, TX (US)

(73) Assignee: FEDEX SUPPLY CHAIN LOGISTICS & ELECTRONICS, INC., Fort Worth, TX (US)

( * ) Notice: Subject to any disclaimer, the term of this patent is extended or adjusted under 35 U.S.C. 154(b) by 183 days.

(21) Appl. No.: 14/186,373

(22) Filed: Feb. 21, 2014

(65) Prior Publication Data
US 2015/0244476 A1 Aug. 27, 2015

(51) Int. Cl.
*H04B 17/00* (2015.01)

(52) U.S. Cl.
CPC ......... *H04B 17/00* (2013.01); *H04B 17/0085* (2013.01)

(58) Field of Classification Search
CPC ............ H04W 24/06; G01R 29/0821; H04B 17/0085; H04B 17/0082; H04B 17/008; H04L 63/14
See application file for complete search history.

(56) References Cited

U.S. PATENT DOCUMENTS

| 4,860,602 | A  | * | 8/1989 | Hines ................. G01R 29/105 165/298 |
| 4,974,317 | A  | * | 12/1990 | Rodriguez, II ...... H05K 7/1461 174/250 |
| 6,903,910 | B1 | * | 6/2005 | Griesing et al. ................ 361/38 |
| 2008/0026748 | A1 | * | 1/2008 | Alexander et al. ......... 455/432.1 |
| 2008/0056340 | A1 | * | 3/2008 | Foegelle ....................... 375/224 |
| 2014/0283029 | A1 | * | 9/2014 | Chandrasekaran et al. .... 726/22 |

OTHER PUBLICATIONS

Azimuth, Azimuth RadioProof enclosures, 2010 http://www.azimuthsystems.com/wp-content/uploads/PB_RadioPrf_0310_sqh_v2.pdf.*
Ni, understand IP ratings, 2013 http://www.ni.com/white-paper/8473/en/pdf.*

* cited by examiner

*Primary Examiner* — Jianxun Yang
(74) *Attorney, Agent, or Firm* — McGuireWoods LLP

(57) ABSTRACT

A system, method, and WiFi test chamber. The WiFi test chamber includes a case defining a number of isolation chambers. The case is configured to prevent radio frequency signals from entering the number of isolation chambers. The WiFi test chamber includes a number of wireless access points (WAPs) with one of the wireless access points in each of the number of isolation chambers. The WiFi test chamber includes interfaces extending from the exterior from the case and connected to the plurality of WAPs.

15 Claims, 4 Drawing Sheets

WIFI TEST CHAMBER

CROSS-REFERENCE TO RELATED APPLICATIONS

This patent application is a co-pending application of U.S. patent application Ser. No. 14/143,142 filed Dec. 30, 2013 entitled "WIRELESS ENCLOSURE FOR TESTING ELECTRONIC DEVICES", U.S. patent application Ser. No. 14/143,094 filed Dec. 30, 2013 entitled "TEST STATION FOR TESTING WIRELESS ELECTRONIC DEVICES", U.S. patent application Ser. No. 13/277,079 entitled "SYSTEM AND METHOD FOR SECURING AND TESTING SET-TOP BOXES" U.S. patent application Ser. No. 12/940,331, filed Nov. 5, 2010 entitled "SYSTEM AND METHOD FOR REMOVING CUSTOMER PERSONAL INFORMATION FROM AN ELECTRONIC DEVICE", U.S. patent application Ser. No. 12/940,346, filed Nov. 5, 2010 "SYSTEM AND METHOD FOR AUDITING REMOVAL OF CUSTOMER PERSONAL INFORMATION ON ELECTRONIC DEVICES", and U.S. patent application Ser. No. 12/940,299, filed Nov. 5, 2010, entitled "SYSTEM AND METHOD FOR TRACKING CUSTOMER PERSONAL INFORMATION IN A WAREHOUSE MANAGEMENT SYSTEM" each of which were previously filed and the teachings and disclosures of which are hereby incorporated in their entireties by reference thereto.

BACKGROUND

The consumption and development of media communications has grown nearly exponentially in recent years. The growth is fueled by larger networks with more reliable protocols and better communications hardware available to both service providers and consumers. In particular, new set-top boxes, gaming devices, televisions, and network devices that are wirelessly enabled are constantly being released.

Wireless network devices are required to go through various forms of testing to ensure compliance with applicable communications and formatting standards, and technical requirements set by standard setting organizations (SSOs), governments, industry groups, companies, service providers, or other applicable parties. Performing wireless tests, including evaluation and analysis for wireless network devices, such as a set-top boxes, residential gateway, or modems, may be time consuming, difficult, and complicated when performing tests for multiple wireless network devices.

SUMMARY

One embodiment provides a system, method, and WiFi test chamber. The WiFi test chamber includes a case defining a number of isolation chambers. The case is configured to prevent radio frequency signals from entering or exiting the number of isolation chambers. The WiFi test chamber includes a number of wireless access points (WAPs) with one of the wireless access points in each of the number of isolation chambers. The WiFi test chamber includes interfaces extending from the exterior from the case and connected to the plurality of WAPs.

Another embodiment provides a wireless testing system. The wireless testing system may include a controller controlling testing of a number of wireless network devices. The wireless testing system may further include a WiFi chamber for performing wireless testing of each of the number of wireless network devices. The WiFi chamber includes a case defining a plurality of isolation chambers. The case is configured to prevent radio frequency signals from entering or exiting the plurality of isolation chambers. The WiFi chamber further includes a number of wireless access points (WAPs) with one of the wireless access points in each of the number of isolation chambers. The WiFi chamber further includes interfaces extending from the exterior from the case and connected to the number of WAPs.

Yet another embodiment provides a WiFi test chamber The WiFi test chamber includes a case defining a number of isolation chambers. The case is configured to prevent radio frequency signals from entering or exiting the number of isolation chambers. The WiFi test chamber includes a number of wireless access points (WAPs) with one of the wireless access points in each of the number of isolation chambers. The WiFi test chamber includes antenna connectors in communication with the number of WAPs for communicating with one of a plurality of wireless network devices being tested. The WiFi test chamber includes power connectors in communication with each of the number of WAPs. The WiFi test chamber includes a data connection in communication with the number of WAPs for providing testing data to each of a number of wireless network devices being tested.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
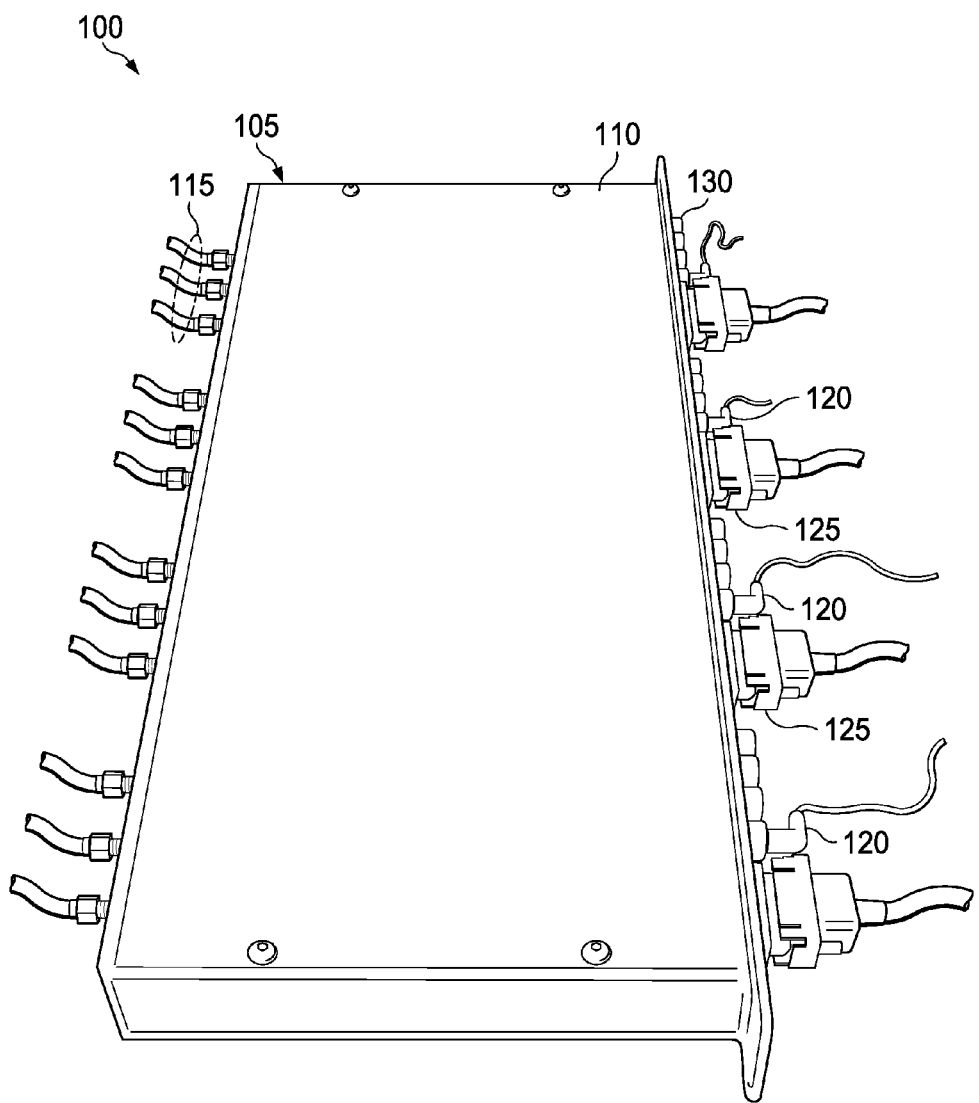
FIG. 1 is a schematic, pictorial representation of a WiFi chamber in accordance with an illustrative embodiment.
Figure 2:
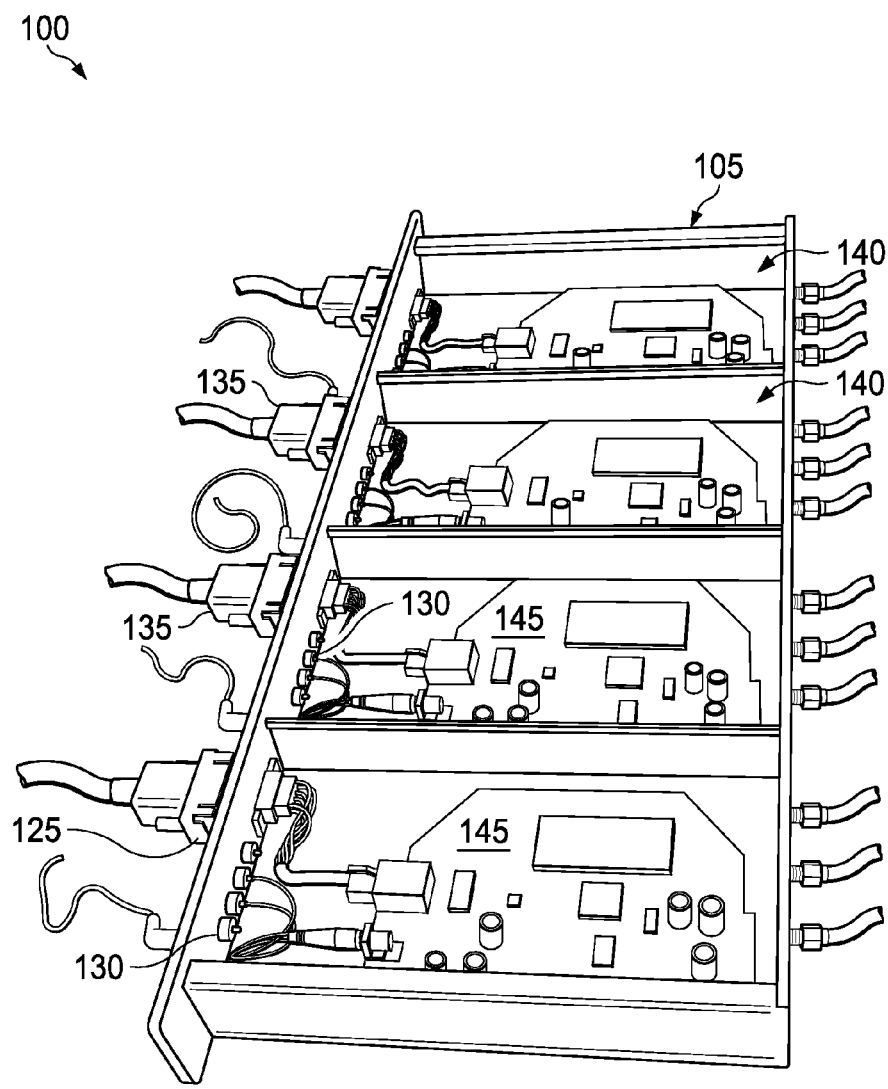
FIG. 2 is a schematic, pictorial representation of a WiFi chamber without a cover in accordance with an illustrative embodiment.
Figure 3:
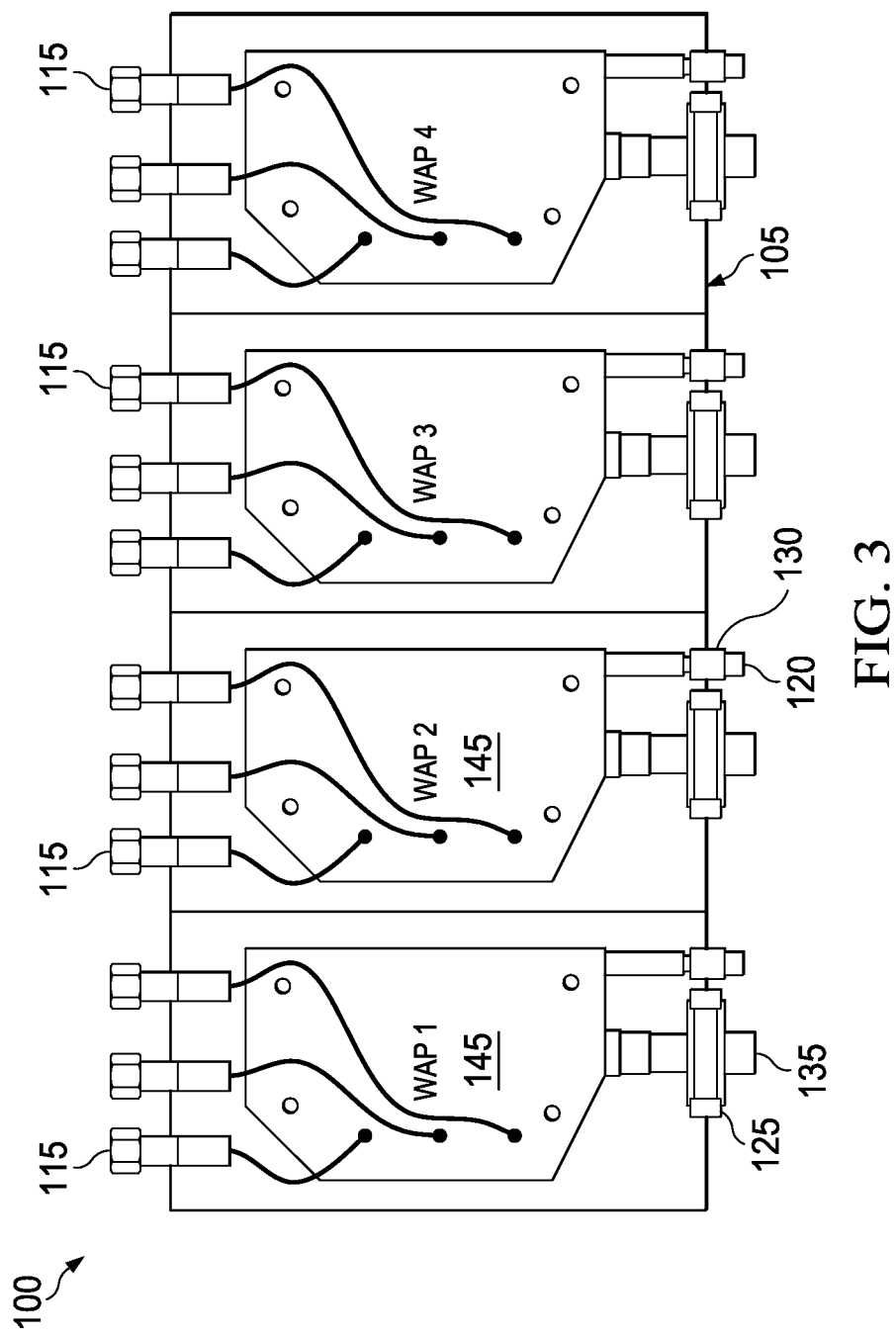
FIG. 3 is a schematic, pictorial representation of wireless access points (WAPs) within a WiFi chamber in accordance with an illustrative embodiment.

Illustrative embodiments provide a WiFi test chamber for isolating wireless access points (WAPs) when testing individual communications paths and wireless network devices. The WiFI test chamber may be utilized alone or with a test fixture, station, stand, device, or system for testing wirelessly-enabled set-top boxes, gaming consoles, residential gateways, digital video recorders, personal video recorders, streaming devices, modems, IPTV devices, cell phones, tablets, and other network devices. The wireless network device(s) being tested may also be referred to as clients or units under test (UUT). The wireless network devices may or may not be stand-alone devices or network/Internet capable devices. As used herein, the term "or" is not mutually exclusive.

In one embodiment, a test fixture, testing station, or test system is a device or system that may be utilized to secure the set-top boxes, residential gateway, or wireless network device while testing and measuring the characteristics and performance of the wireless network device for performing the required features, processing, and formatting required of the wireless network device. The test fixture may be enabled to receive multiple wireless network devices simultaneously, such as in nested platforms. For example, the test fixture may include eight or more nested platforms for receiving wireless network device. However, the test fixture may be used for more or less wireless network devices. In one embodiment, the test fixture may include one or more adapter modules and interfaces for powering and communicating with the wireless network device. The test fixture may further isolate the wireless network devices from outside radio frequency interference so that the testing may be performed in a controlled environment. In one embodiment, antennas connected to the WAPs of the WiFi chamber may be inserted into a test chamber that is otherwise isolated for performing testing. A number of antennas may be utilized for both transmitting and receiving content from the wireless network devices to ensure full wireless functionality of the wireless network devices.

The testing of the wireless network devices may be performed simultaneously, concurrently, or as needed. In one embodiment, multiple WiFi test chambers may be associated with each test fixture for testing all of the wireless network devices as the same time. The test fixture may also include a user interface for an operator, test engineer, or other individual to interface with the test fixture. For example, the user interface may include peripherals, such as a monitor, keyboard, mouse and scanner.

The test fixture may automatically perform pre-established tests, processes, and software updates for testing the wireless network device and ensuring that all customer private information (CPI) has been removed. The test fixture may test the wireless functionality of the wireless network devices. The wireless connections may also be utilized to reconfigure, update, and test the wireless network devices utilizing the wireless connections in addition or instead of a physical connection. The test fixture may also be utilized for performing testing for wireless network device that operate wirelessly or include wireless functionality. The test fixture may include computing and communications components, including, but not limited to processors, logic, memories, communication ports and interfaces and databases for storing programs, applications, and instructions utilized to perform the automated testing. In another embodiment, a user may utilize the user interface to perform manual testing as needed.

The testing results may be displayed to the test fixture or displayed or communicated to one or more external devices. In one embodiment, a display is partitioned to display results for each of the residential gateways for purposes of efficiency. The illustrative embodiments may be utilized for returned, refurbished, repaired, or new network devices to efficiently perform tests and analysis. Automated testing removes operator subjectivity, improves quality control, and makes testing faster and less expensive.

The wireless network device may be configured to perform communications utilizing any number of wired and wireless communications standards, protocols, or formats along with associated hardware, software, and firmware including coaxial cable, twisted pair, digital subscriber line (DSL), fiber optics, T-1, WiMAX, WiFi, wideband code division multiple access (W-CDMA), CDMA, global system for mobile communications (GSM), general packet radio service (GPRS), enhanced GPRS (EGPRS), high-speed downlink packet access (HSDPA), evolution-data optimized (EVDO), Bluetooth, GPS, WiMAX, personal communications service, and other developing forms of digital and analog communications. The test fixture may also be utilized to perform radio frequency (RF) testing if the wireless network device is enabled for wireless communications including testing a remote control associated with the wireless network device.

In particular, the test fixture may allow different model types of wireless network device to be repeatedly tested. For example, the test fixture may be configured to test multiple wireless network devices for any model of a particular manufacturer. After the test fixture is initially configured, multiple wireless network devices of a manufacturer having the same or different models may be tested utilizing the test fixture. The test fixture may be configured or programmed to easily receive wireless network devices for testing at a later time. The test fixture may allow a user to quickly insert the wireless network device into the nested platform. As a result, multiple tests for wireless network devices may be carried out efficiently and consistently and with a high degree of accuracy for wireless network device reducing costs, time, and difficulty.

The test fixture and WiFi chamber may be utilized by governmental entities, SSOs, companies, research and development groups, industry regulators, and others that build, test, repair, or refurbish wireless network device. The test fixture may be configured without any special tools or expensive training. For example, set screws may be utilized to position and secure the components of the test fixture. The test fixture provides a universal test stand, platform, or fixture that may be shared or utilized for numerous wireless network device, reducing the testing equipment and lab costs that may be required to test each wireless network devices The test fixture may allow testing for a wireless network device to be repeated by multiple parties (original equipment manufacturers (OEMs), service providers, government entities). In particular, being able to consistently reproduce media testing may be important when important findings, such as compliance failures or communications failures are measured or tested. The media testing may include formatting and communications to and from the wireless network device. For example, testing programs, instructions, scripts, or algorithms may be developed for each type, model, or configuration of wireless network device for implementation by the WiFi test chamber. In one embodiment, a controller, switch, and other network components of the test fixture may communicate test data to the WAPs of the WiFi chamber for communication to the wireless network devices through one or more antennas.

The test fixture allows for the automatic testing of internal and external components (e.g., memories, ports, interfaces, etc.) as well as video and audio tests. In one embodiment, the tests may be run in parallel to reduce the time required for each of the tests. The software and testing routines may be updated as required for performing the testing. The test results may be saved and post-test parametric and trend analysis may be performed and reported to any number of services providers, manufacturers, or other interested parties.

Turning now to FIGS. 1-4 illustrating an embodiment of a WiFi chamber 100 in accordance with an illustrative embodiment. The WiFi chamber 100 may have any number of shapes and configurations. The WiFi chamber 100 may be utilized as a stand-alone device or as an integrated part of a testing system for testing set-top boxes, residential gateways, intelligent network devices, or other wireless enabled devices. For example, multiple WiFi chambers may be utilized for each test station or testing system. The shapes and configurations of the WiFi chamber may vary based on the electronic devices being tested and a configuration of the testing system or platforms that may be utilized in conjunction with the WiFi chamber.

In one embodiment, the WiFi chamber 100 may include a case 105, a cover 110, antenna connectors 115, power connectors 120, data connectors 125, power filters 130, data filters 135, isolation chambers 140, and wireless access points (WAPs) 145. As shown, the WiFi chamber 100 may include one or more ports for communications cables, power supplies, data connections, ground connections, and so forth. In one embodiment, the ports are fixed connections between the WAPs 145 and the antenna connectors 115, the power connectors 120, the data connectors 135, and other inputs/outputs to prevent RF leakage. In other embodiments, the ports may include flexible blockers (e.g., doors, tabs, screens, etc.) and configured to prevent RF leakage through the ports.

As shown in FIG. 1, the WiFi chamber 100 may be configured to isolate the WAPs 145 from outside interference and noise. In one embodiment, all or portions of the WiFi chamber 100 may be formed of absorbing and reflective materials that attenuate or completely block external wireless signals from entering the WiFi chamber 100 and internal wireless signals from exiting the WiFi chamber 100. For example, the case 105 may be formed of absorbing and reflective materials or may be layered, covered, or coated with such materials.

Although not explicitly called out, the case 105 may include a base, sides, back, top or cover, and so forth. In one embodiment, the case 105 may be formed from one or more aluminum panels or sections. For example, different support components of the WiFi chamber 100 may utilize a tongue and groove interconnection to eliminate internal cross talk and to isolate the isolation chambers 140 within the WiFi chamber 100. The components of the case 105 may be molded together or attached utilizing screws, adhesives, rivets, hinges, and interference fit, or any number of other connectors. For example, the case 105 may include walls or edges that define the isolation chambers 140. The isolation chambers 140 may be equally sized or may vary based on the size, shape, and configuration of the individual WAPs 145 being utilized.

In one embodiment, the case 105 may be formed of any number of materials for preventing signals from entering or exiting the WiFi chamber 100. For example, the WiFi chamber 100 may represent any number of metals, foam, mesh, polymers, plastic, or so forth. The WiFi chamber 100 may include materials that are layered, laminated, adhered, molded, or otherwise attached to perform RF absorption and blocking. For example, a first layer of the case 105 may include an absorbent layer layered on a second layer of reflective material. All or portions of the interior of the case 105 may be covered with one or more types of isolation mesh. For example, the isolation mesh may provide blocking of radiated signal entering or exiting the chamber from paths other than designed. Attenuation factors for the WiFi chamber 100 may be limited by the material rating. As a result, multiple layers may be stacked in such a way to increase RF blocking above a single layer manufacturing specification. Any number of layers may be utilized to obtain the necessary level of attenuation or RF isolation. Additionally, the characteristics of the case 105 including machining, molding, or welding of the interconnecting surfaces, such as in a tongue and groove fashion, also adds to the isolation characteristics of the WiFi chamber 100.

In one embodiment, the case 105 may be formed of two different types of meshes. For example, an outer layer may be reflective mesh layer and the inner layer may be an absorbing layer utilized to provide greater attenuation. The outer layer may reflect signals that bombard the WiFi chamber 100 from the outside while the internal layers may absorb the RF energy emanating from the WAPs 145 within the isolation chambers 140 rather than allowing the signals to reflect within the WiFi chamber 100 potentially causing reflective fading or ghost signal paths during testing of electronic devices. The case 105 may be configured to isolate any number of radio frequency signals, such as signals up to 6 GHz. However, the case 105 may be adapted for any range of signals for implementing the testing. For example, the case 105 may isolates the WAPs 145 to 50-100 dB or more. By attenuating the signals and preventing unwanted radio frequencies from entering or leaving the WiFi chamber 100 the WiFi chamber 100 may enable gold standard wireless testing for a number of wireless network devices. For example, the WiFi chamber 100 may be utilized to perform standardized testing under various standards and protocols to ensure a valid wireless environment is utilized.

In one embodiment, the WiFi chamber 100 may include the cover 110. The cover 110 may be configured to be easily removed for accessing the interior of the WiFi chamber 100. For example, the cover 110 may be configured to easily slide off or be attached utilizing connectors. The cover 110 may also utilize a latching mechanism, interference fit, or other securing device to secure it in place.

In one embodiment, the WAPs 145 may represent multiple-input and multiple-output (MIMO) wireless access points. The WAPs 145 may utilize multiple antennas at both the transmitter and receiver to improve communications performance. As shown, the point of transmission and reception of data utilized by the WAPs 145 may be remote from the WiFi chamber 100. As a result, remote antennas may be utilized to send and receive the signals communicated to and processed by the WAPs 145. The WAPs 145 may utilize any number of existing, under development, or future WiFi protocols or standards, such as 802.11. The software, firmware, or hardware of the WAPs 145 may be configured to be upgraded. For example, the WAPs 145 may include memories, processors, or field programmable gate arrays for receiving and updating communications protocols utilized by the WAPs 145.

The components of the WAPs 145 including interfaces for power, incoming data, and communications may be interconnected with the interfaces including connectors and ports by any number of wires, traces, busses, or other communications mediums. For example, the external interfaces, such as the antenna connectors 115, power connectors 120, and data connectors 125 may be connected to the associated electronics of the WAPs utilizing flexible wires. The interfaces and connectors may pass through holes, slots, or ports in the case 105. In another embodiment, the antennas may be fixedly connected directly to the WAPs 145 for testing the wireless network devices.

In one embodiment, each antenna or transceiver connection or port of the WAPs 145 may be connected to the antenna connectors 115. Each WAP 145 may include any number of antenna connectors 115. In one embodiment, the WAPs 145 may utilize three antenna connector's 145. However, the number and configuration of the antenna connectors 115 is not limited. In one embodiment, the antenna connectors 115 are coaxial connectors. For example, the coaxial connectors may be utilized to extend the antennas into a test chamber for test a network device utilizing one of the WAPs 145. Different types of antenna connectors and associated antennas may also be utilized as is known in the art.

Each of the WAPs 145 is powered by one of the power connectors 120. In one embodiment, the power connectors 120 are a DC port for receiving a male end of a DC connector utilized for powering each of the WAPs 145. However, other types of power connectors 120, such as AC connections may also be utilized. The WiFi chamber 100 or the WAPs 145 may include transformers, converters, or other components for processing the electrical signals to power the WAPs 145 and interconnected components. The power filters 130 are configured to filter radio frequency signals from the power signal. For example, the power connector 120 may be configured for receiving a power adapter or power brick.

The data connectors 125 may represent any number of connectors for receiving a data connection. The data connectors 125 may represent an RJ-45 port for receiving an RJ-45 head associated with an Ethernet connection. However, the data connectors 125 may represent any number of standard or proprietary data connectors 125.

Likewise, the data filters 135 may filter unwanted signals that may be communicated through a cable, wire, bus, or other communications medium. For example, parasitic or extraneous radio frequency signals may be induced in the shielding of a data cord and may be filtered by the data filters 135.

Figure 4:
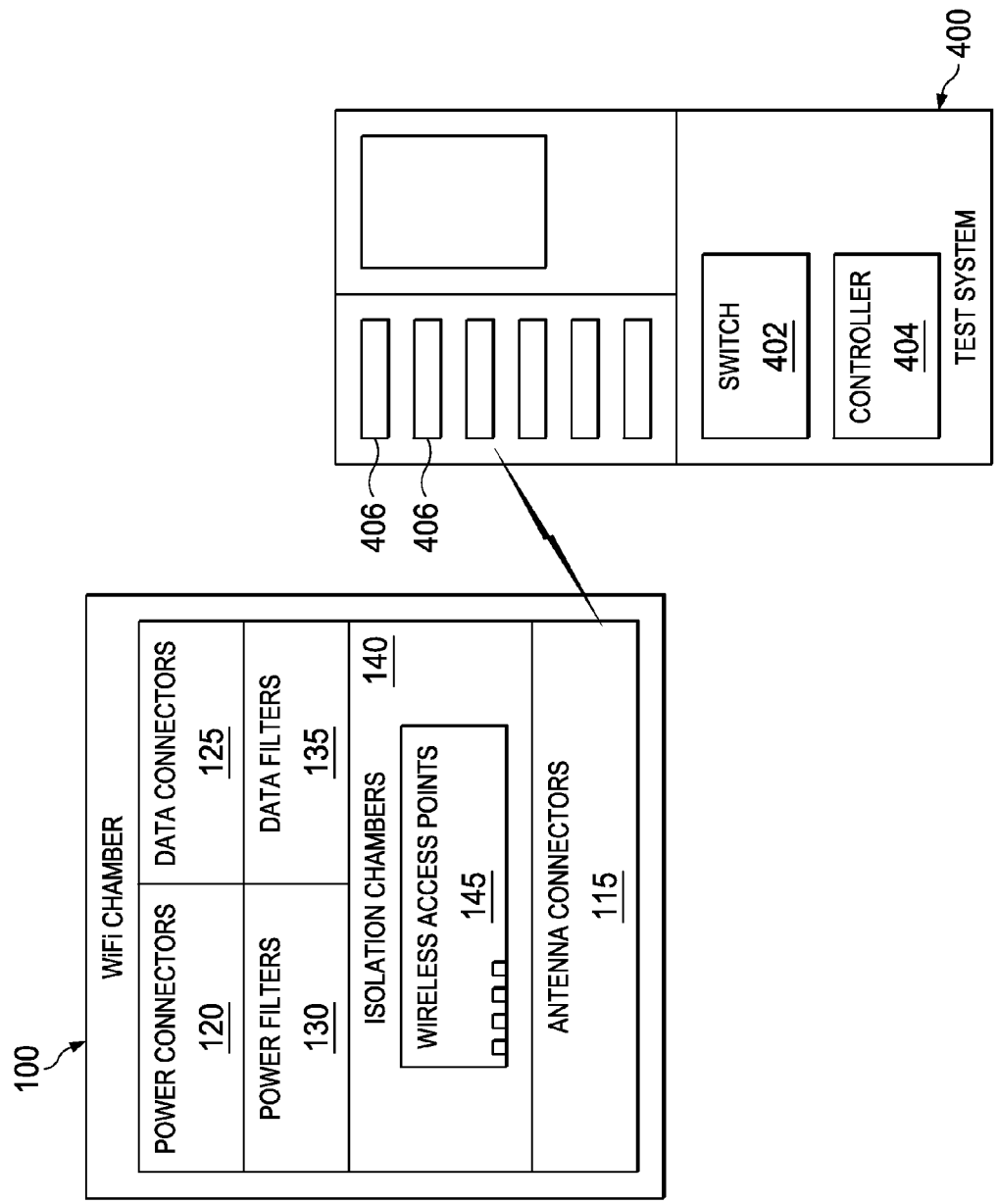
FIG. 4 is a block diagram of a test a testing system in accordance with an illustrative embodiment.

Turning now to FIG. 4 illustrating a testing system 400 incorporating the WiFi chamber 100 in accordance with an illustrative embodiment. The testing system 400 further includes a switch 402, a controller 404, wireless network devices 406, and a number of other components as are described in the art incorporated by reference herein.

The controller 404 controls the operation of the WAPs 145 shown. In one embodiment, the controller generates testing data that is communicated to the WAPs through the switch 402. Each of the WAPs 145 may have a unique hardware or software identifier, such as IP address or MAC address, utilized for routing the testing data to the WAPs 145 and then to the respective wireless network devices 406.

The switch 402 communicates with the WAPs 145 through the data connectors 125. For example, the WAPs 145 may be connected to the switch 402 by Ethernet cables. The switch 402 may route the associated test data to each of the WAPs 145 and associated wireless network devices 406.

In one embodiment, the controller 404, and the switch 402 may be integrated with the WiFi chamber 100 to perform testing. The controller 404 may include a processor and a memory for storing a set of instructions and executing the set of instructions to perform testing of a number of wireless network devices.

The WiFi testing performed by the testing system 400 provides an over-the-air communication path to the unit(s) under test (UUT), such as the wireless network devices 406. Testing performed by the testing system may include: determining the received signal strength indicator (RSSI) of the wireless network devices 406 at the wireless access point (WAP) antenna, RSSI transmitted and received from the wireless network devices 406, physical rate (e.g., Mbps) from the WAP (e.g., WiFi 802.11 b/g/n/or developing standards, Bluetooth, Zigbee, etc.), operating mode from the WAP, packet transmit counter from the WAP to the applicable wireless network device 406, packet receive counter from the wireless network device 406 to the WAP, transmitted Internet control message protocol (ICMP) echo request packets, received ICMP reply packets, received ICMP packets in which the checksum field was in error, error rates, latency, and so forth.

The WiFi testing may include any number of methods, steps, or processes that may be utilized interchangeably or with the modifications or variations herein described. The WiFi chamber 100 may be connected to or integrated with the testing system 400. For example, power and data connections may be established between power sources of the testing system 400 (e.g., AC ports connected to DC power adapters) and data connections. One or more antennas may be positioned to communicate with each of the wireless network devices 406 to perform testing in isolation. For example, the wireless network devices 406 may be in an RF shielded chamber to which multiple antennas, connectors, and cables are routed for communicating and receiving data from the wireless network devices 406. The WAPs 145 may be turned on. Self-diagnostics may be performed on the WAPs 145 to ensure functionality.

The WAPs 145 may also be programmed or updated with information specific to the types of tests being performed as needed. The controller 404 may select data or test scripts specific to the make, model, communications service provider, software, or other configuration of the wireless network devices 406 to be communicated from the controller 404. The data communicated by the controller 404 is separated by the switch 402 to the respective WAPs 145 for communication to the individual wireless network devices 406 to perform testing. A number of tests of the wireless network devices are performed. The wireless connection between the WAPs 145 and the wireless network devices 406 may also be utilized to reconfigure the wireless network device, update software, pictures, default content, applications, or so forth, remove customer personal information, or perform any number of tests or operations on the wireless network device as outlined in the related applications cited above. The results are logged and recorded according to each of the WAPs 145 being utilized. In one embodiment, each of the WAPs 145 may have a unique identifier. Each component and the operator supervising the testing may also have a unique identifier for detailed logging and troubleshooting. The results may also be displayed to the operator in real-time. The results may also be communicated to one or more designated parties, such as manufacturers, refurbishers, communications service providers, and so forth.

In the previous embodiments, reference is made to the accompanying drawings that form a part hereof. These embodiments are described in sufficient detail to enable those skilled in the art to practice the invention, and it is understood that other embodiments may be utilized and that logical, structural, mechanical, electrical, and chemical changes may be made without departing from the scope of the invention. To avoid detail not necessary to enable those skilled in the art to practice the embodiments described herein, the description may omit certain information known to those skilled in the art. The detailed description is, therefore, not to be taken in a limiting sense, and the scope of the illustrative embodiments is defined only by the appended claims.

In the drawings and description that are included, the drawing figures are not necessarily to scale. Certain features of the invention may be exaggerated in scale or in somewhat schematic form and some details of conventional elements may not be shown in the interest of clarity and conciseness.

The previous detailed description is of a small number of embodiments for implementing the invention and is not intended to be limiting in scope. The following claims set forth a number of the embodiments of the invention disclosed with greater particularity.

What is claimed:

1. A wireless test chamber, comprising:
a case comprising a plurality of isolation chambers and a single removable cover for accessing the plurality of isolation chambers, the single removable cover configured to cover all of the plurality of isolation chambers, wherein the case is configured to prevent radio frequency signals from entering and exiting the plurality of isolation chambers; wherein the case includes two or more mesh layers for filtering radio frequency signals, wherein the two or more mesh layers include at least an inner absorption layer and an outer reflective layer; wherein the case is formed from one or more aluminum panels; wherein the case further comprises an integrated controller and an integrated switch; wherein the controller is configured to select data or test scripts specific to the make, model, communications service provider, or software of a wireless device; wherein the controller is further configured to communicate the select data or test scripts specific to the make, model, communications service provider, or software to the wireless device;
a plurality of wireless access points (WAPs), wherein each of the plurality of isolation chambers includes one of the wireless access points; and
interfaces extending from the exterior from the case and connected to the plurality of WAPs.

2. The wireless test chamber according to claim 1, further comprising:
a power filter and a data filter associated with each of the WAPs for filtering radio frequency signals from a power signal and a data signal, respectively.

3. The wireless test chamber according to claim 1, wherein the interfaces include a plurality of antenna connectors for each of the plurality of wireless access points.

4. The wireless test chamber according to claim 3, further comprising:
remote antennas connected to the plurality of antenna connectors for communicating with the wireless device.

5. The wireless test chamber according to claim 4, wherein the wireless device is one of a plurality of wireless devices being tested in a testing system integrated with the wireless test chamber.

6. The wireless test chamber according to claim 1, wherein the WAPs are utilized for testing wireless functionality of a plurality of wireless network devices simultaneously.

7. The wireless test chamber according to claim 1, wherein each of the WAPs is connected to the controller for controlling testing operations performed by the wireless test chamber.

8. A wireless testing system comprising:
a controller controlling testing of a plurality of wireless network devices;
a wireless chamber for performing wireless testing of each of the plurality of wireless network devices, the wireless chamber comprising:
a case comprising a plurality of isolation chambers and a removable cover for accessing the plurality of isolation chambers, wherein the case is configured to prevent radio frequency signals from entering and exiting the plurality of isolation chambers; wherein the case includes two or more mesh layers for filtering radio frequency signals, wherein the two or more mesh layers include at least an inner absorption layer and an outer reflective layer; wherein the case is formed from one or more aluminum panels; wherein the controller is integrated with the case; wherein the case further comprises an integrated switch; wherein the controller is configured to select data or test scripts specific to the make, model, communications service provider, or software of the plurality of wireless network devices; wherein the controller is further configured to communicate the select data or test scripts specific to the make, model, communications service provider, or software to the plurality of wireless network devices;
a plurality of wireless access points (WAPs) with one of the wireless access points in each of the plurality of isolation chambers; and
interfaces extending from the exterior from the case and connected to the plurality of WAPs.

9. The wireless testing system according to claim 8, wherein the switch is in communication with a router for communicating test data to each of the plurality of WAPs.

10. The wireless testing system according to claim 8, wherein the interfaces include a plurality of antennas connected to each of the WAPs and configured to test one of the wireless network devices.

11. The wireless testing system according to claim 8, wherein the interfaces include a power connector, a data connector, and a plurality of antenna connectors.

12. The wireless testing system according to claim 8, wherein the wireless chamber further comprises:
a power filter and a data filter associated with each of the WAPs for filtering radio frequency signals from a power signal and a data signal, respectively.

13. A wireless test chamber, comprising:
a case comprising a plurality of isolation chambers and a removable cover for accessing the plurality of isolation chambers, wherein the case is configured to prevent radio frequency signals from entering and exiting the plurality of isolation chambers; wherein the case includes two or more mesh layers for filtering radio frequency signals, wherein the two or more mesh layers include at least an inner absorption layer and an outer reflective layer; wherein the case is formed from one or more aluminum panels; wherein the case further comprises an integrated controller and an integrated switch: wherein the controller is configured to select data or test scripts specific to the make, model, communications service provider, or software of a plurality of wireless network devices; wherein the controller is further configured to communicate the select data or test scripts specific to the make, model, communications service provider, or software to the plurality of wireless network devices;
a plurality of wireless access points (WAPs) with one of the wireless access points in each of the plurality of isolation chambers;
antenna connectors in communication with the plurality of WAPs for communicating with the plurality of wireless network devices being tested;
power connectors in communication with each of the plurality of WAPs; and
a data connection in communication with the plurality of WAPs for providing testing data to the plurality of wireless network devices being tested.

14. The wireless test chamber according to claim 13, further comprising:

a power filter and a data filter associated with each of the WAPs for filtering radio frequency signals from a power signal and a data signal, respectively.

15. The wireless test chamber according to claim 13, wherein the wireless test chamber is integrated with a test system utilized to simultaneously test the plurality of wireless network devices.

\* \* \* \* \*